United States Patent [19]

Testone

[11] Patent Number: 5,660,662
[45] Date of Patent: Aug. 26, 1997

[54] METHOD AND APPARATUS FOR FORMING FILLED CUSHIONS, AND FILLED CUSHIONS

[75] Inventor: Anthony O. Testone, Schwenksville, Pa.

[73] Assignee: Testone Enterprises, Inc., Skippack, Pa.

[21] Appl. No.: 428,708

[22] Filed: Apr. 25, 1995

[51] Int. Cl.$^6$ ........................................ B32B 31/20
[52] U.S. Cl. ............................ 156/145; 53/403; 53/454; 156/146; 156/147; 156/156; 156/290; 156/292; 156/308.4; 156/324; 264/516; 264/545; 264/572; 428/69; 428/76
[58] Field of Search .................. 428/69, 76; 156/145, 156/146, 147, 156, 290, 292, 164, 251, 308.4, 324; 53/403, 454; 264/516, 545, 572

[56] References Cited

U.S. PATENT DOCUMENTS

| | | | |
|---|---|---|---|
| 1,402,293 | 1/1922 | Heist | 156/145 |
| 1,654,647 | 1/1928 | Heist | 156/199 |
| 2,262,493 | 11/1941 | Guinzburg | 156/164 |
| 2,555,369 | 6/1951 | Pollitt et al. | 425/5 |
| 3,575,757 | 4/1971 | Smith | 156/147 |
| 3,713,930 | 1/1973 | Levrini et al. | 156/147 |
| 3,868,285 | 2/1975 | Troy | 156/147 |
| 3,938,298 | 2/1976 | Luhman | 156/147 |
| 4,049,854 | 9/1977 | Casey et al. | 428/72 |
| 4,417,936 | 11/1983 | Gaffney | 156/45 |
| 4,564,407 | 1/1986 | Tsuruta | 156/147 |
| 4,668,316 | 5/1987 | Sager | 156/73.1 |
| 5,256,234 | 10/1993 | Mutaguchi et al. | 156/244.27 |

*Primary Examiner*—Nasser Ahmad
*Attorney, Agent, or Firm*—Irvine A. Lavine

[57] ABSTRACT

Apparatus for joining cohesive coated plastic sheets in a closed peripheral pattern with bulging of at least one sheet within the closed peripheral pattern to provide a sealed compartment containing only a gas such as air, or foam, under superatmospheric pressure. A method for forming a sealed bulging compartment containing substantially only a gas at superatmospheric pressure comprises joining two cohesive material coated sheets by engagement of said portions of said cohesive material coating at a closed periphery while causing at least one of the sheets to be bulged by gas at superatmospheric pressure. A bulging sealed cushion formed of two sheets each coated on one side with cohesive, air impervious material, at least one of the sheets being bulged outward, and containing substantially only a gas at superatmospheric pressure.

5 Claims, 5 Drawing Sheets

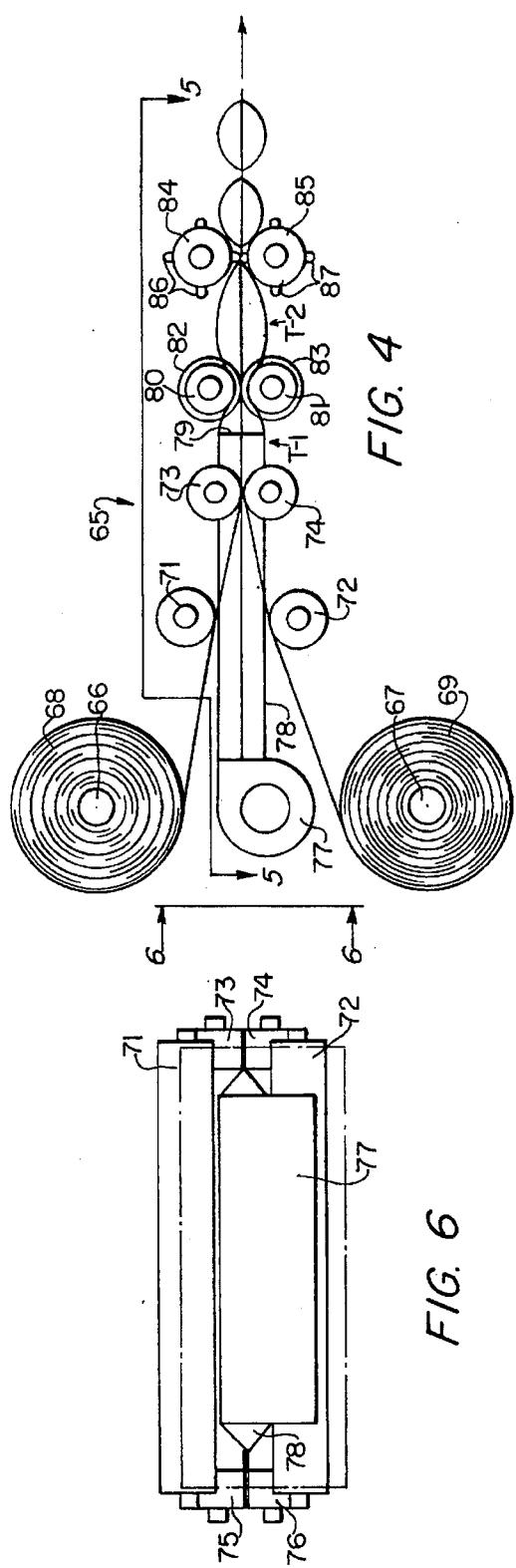
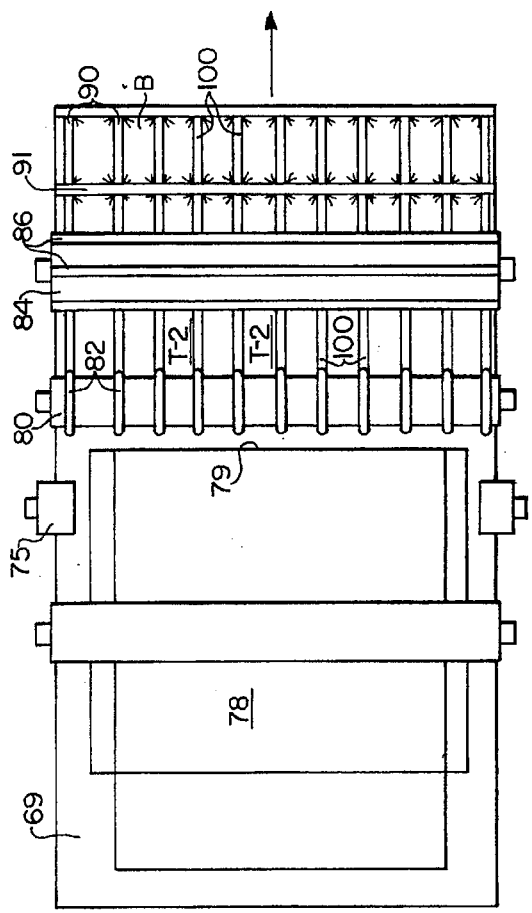

METHOD AND APPARATUS FOR FORMING FILLED CUSHIONS, AND FILLED CUSHIONS

BACKGROUND OF THE INVENTION,

The present invention is related to a method and apparatus for producing filled cushions.

FIELD OF THE INVENTION

Various materials have been provided for the packaging of fragile objects within a container, for shipment and storage. Sawdust is a material known and used for this purpose for many years. A more recent advance is the provision of small foam plastic bodies which may have the approximate shape of a peanut, or other shapes. These foam plastic bodies provided cushioning of the fragile objects against shock forces or impacts during shipment.

Another cushioning material is provided in the form of large sheets of plastic material having sealed, gas filled compartments in the sheets. This cushioning material is made by heat bonding thermoplastic sheet(s) using heated bars and rollers, which require a start-up heating period. Alternatively, bonding may be achieved using ultrasonic energy, but the production rate is unacceptably slow. The material is manufactured and shipped to users in sheets, usually having a minimum width of thirty-six inches. Typically, it is 3 mils thick. Shipment is conventionally in the form of rolls of substantial length, or a plurality of rolls of lesser length, such as a few yards.

All of the cushioning products discussed above require a substantial amount of space for shipment and for storage by the user prior to use. In addition, storage of the sheets of plastic material with gas filled compartments has not been entirely satisfactory, due to the fact that air has leaked from the compartments, reducing the cushioning effect of this material.

Foods such as candy bars and small portions of cookies and crackers have been packaged using plastic sheets which are, sealed by cohesive material. The plastic sheet has a slip agent or release agent on one side, and there is provided a pattern coating of cohesive material on the other side. The pattern coating of cohesive material bonds to itself by contact. In a typical machine, a plastic strip is fed from a roll, and is imprinted with a pattern with cohesive material, the pattern being an open rectangle. A food product, such as a candy bar, is deposited within the cohesive material open rectangle, and the strip is formed around the candy bar so that the longitudinally extending portions of the open rectangle pattern come into engagement. A crimp seal apparatus is provided having a first jaw with spaced pressing portions with a knife between them. A second jaw has a pair of spaced pressing portions opposite the pressing portions of the first jaw, with a space between them to receive the, knife of the first jaw. This crimp seal apparatus then impacts the leading end of the strip, to cause engagement of the transverse portions of the open rectangle of cohesive material at that end. The strip, now sealed at one end, and with the candy bar in it, is transported in stepwise fashion to bring the trailing end of the first package between the jaws of the crimp seal apparatus. One pair of pressing portions seal the rear of the first package, and the other pair of pressing portions seals the front of the second package, while the knife separates the first, sealed package from the strip. This machine operates at atmospheric pressure and avoids trapping excess air in the package, which contains only the candy bar or other product, together with air which is at substantially atmospheric pressure. The internal exposed surface of the plastic sheet which serves as the package for the candy bar or other product is not coated with cohesive material.

Cohesive material is widely used in the production of single package, candy bars, and is commercially available from many companies, including, for, example, Allied Adhesive, Morton Chemicals of Chicago, Ill., and National Starch.

The above described apparatus will be seen to produce packages containing an article, such a candy bar, cookies or crackers, the package being sealed at a peripheral line and having these objects within it, at substantially atmospheric pressure; the package is not coated within the seal.

SUMMARY OF THE INVENTION

An apparatus is provided for making pressurized air filled cushions, using thermoplastic sheets each coated on one side with cohesive material. The cohesive plastic material is substantially air impervious. The apparatus comprises a pair of unheated implements, specifically forming rollers having their axes parallel, with a nip between them, each roller having a plurality of circumferentially spaced depressions in the surface, each of which is bounded by transverse and peripheral lands. A cutting structure is provided between adjacent depressions. A pair of rolls of thermoplastic strip or sheet material is provided, with one side coated with cohesive material. The two strips are fed towards the nip of the rollers, and a nozzle is provided for directing air between the plastic strips, the air heating both of the plastic strips adjacent a depression in each of the rollers. The force of the air causes the plastic strips to deform so as to assume the configuration of the depressions in the rollers. As the strips advance, and the rollers rotate, a transverse land on each of the rollers causes transverse bonding of the plastic strips, and the lateral edge regions of the plastic strips are bonded by the peripheral lands; subsequent transverse lands on the rollers provide a lateral seal or bond behind the depressions, and the cutting structure severs a completed sealed and pressurized cushion. The structure including the rollers and supports for the rolls of plastic strips may be mounted on, for example, a vertical or horizontal plate, and in small embodiments, a handle may be provided for supporting the plate.

A method for making pressurized air filled cushions comprises the steps of feeding first and second cohesive coated thermoplastic strips, forming a bulge in at least one of the strips, and then closing the bulge while subjecting the strips to superatmospheric pressure between them to form a pressurized pocket by causing the plastic strips to be bonded at a region surrounding the bulge(s).

In an alternate apparatus, first and second rollers, preferably mounted on horizontal axes, are provided with a nip between them and each having a depression in the periphery, surrounded by a land. One roller has a knife and the other roller has a recess for receiving the knife, for severing plastic material. Two thermoplastic strips in roll form are provided, and coated on facing surfaces with cohesive material. Each strip is led to the rollers, so as to be in contact at the nip of the rollers. The rollers are heated, and have openings in the depressions, which are connected to a suction apparatus. As the strip of coated thermoplastic material reaches the rollers during their rotation, the heat from the roller and the suction cause the thermoplastic to be deformed, so as to provide a bulge in each strip. Depressions in the rollers are in facing, opposed relationship, and there is placed an interacting foam-forming component into each of the depression in the plastic strips. As the rollers rotate and draw plastic strips from the plastic strip rolls, a seal will be formed around each bulge by the contacting of the cohesive material, to thereby provide a series of sealed foam filled cushions upon interaction of the foam forming components; each cushion is then severed from the plastic strip.

A method is provided in which first and second thermoplastic cohesive material coated strips each has a bulge in it, the bulges being in opposed, facing relationship. A first interactive foam forming component is deposited in a first bulge and a second such component is deposited in a second bulge, after which the strips are bonded together by the cohesive material to form a pocket which is peripherally sealed, with the foam forming components and/or foam within it.

Another apparatus is provided for making cushioning material of substantial width and any desired length comprising laminated sheets having pressurized air cushions in them. Two rolls of cohesive material coated sheets, preferably of inelastic plastics, are guided along converging paths with their coated surfaces in facing relationship. A blower directs air between the sheets. A pair of edge seal wheels at each edge region of the sheets cause these edge regions to be joined by engaging the cohesive material. The sheets inwardly of the sealed edge regions are held apart by the air between them. The inflated, edge-sealed sheets are then delivered to a pair of rollers with opposed peripherally extending and laterally spaced lands which provide linear, parallel sealed regions along the width of the strip, with inflated tubular compartments between them. The inflated joined sheets are then passed to a pair of rollers having transverse lands, which provide a grid of sealed regions, with inflated portions of the two strips forming cushions between the transverse and longitudinal sealed zones or regions which form the grid. The sheet with air cushions or bubbles may be severed at any desired location to provide strips of the desired length, or individual inflated cushions.

In an alternate embodiment of the apparatus, a pair of rolls of sheets, which may be NYLON or other substantially non-stretchable material, and having one side of each sheet coated with a layer of cohesive material, are held on shafts, with the cohesive material in facing relationship. Between these sheets, as they are drawn from their rolls, is a nozzle, which is preferably of flattened shape with openings in the side faces which face the cohesive coating layer on the two sheets, and with a distal end which may have openings, or which may be closed. A pair of side sealing rollers engages the edge regions of the sheets, causing them to bond together by engagement of the cohesive material on each sheet. There is thus formed a tube, and this tube is led into a restrainer comprising, for example, a pair of facing channels. The sealed edge regions extend laterally outwardly of the restrainer, and the restrainer engages the outer side of the tube, restraining the tube against expansion into a tube of round cross-section. The channels may be moved towards or away from each other by suitable control apparatus. The channels have longitudinally extending slots in transverse array, and a plurality of sealing wheels, mounted on opposed shafts, extend into the slots, to form spaced nips, so that the tube is thereby formed into a plurality of smaller parallel tubes. These smaller tubes then pass between a pair of rollers having transversely extending mating lands, to provide a sheet with inflated cushions in grid-like pattern, with each cushion surrounded by a peripherally extending sealed zone formed by engagement of the cohesive material on each sheet.

Among the objects of the present invention are to provide an apparatus and method for rapidly and economically forming, on site for immediate use, a plurality of filled cushions.

Another object of the invention is the provision of an apparatus and method in which the components of the apparatus may be placed at the point of use for filled cushions and which may be readily and economically employed to provide a series of individual filled cushions.

A still further object of the present invention is to provide an apparatus and method for producing filled cushions which is simple, inexpensive, and does not require large and heavy machinery, large supplies of chemicals, or a significant amount of electric and fluid supply.

Yet another object of the present invention is to provide a point-of-use apparatus and method capable of forming with simple and inexpensive machinery sheets of indeterminate length containing inflated, gas filled and gas impervious pockets or cushions, which may be severed as desired.

Another object is to provide apparatus and method for making filled cushions in which making and sealing cushions at superatmospheric pressure is achieved without the necessity of registration of patterns of coatings on moving sheets.

Yet another object is to provide filled sealed cushions which may be produced on site and promptly on demand in an economical manner and which will maintain above atmospheric pressure for long periods of time.

These and other objects and many of the attendant advantages of the present invention will be readily understood from the following specification and claims, and by reference to the appended drawings.

BRIEF DESCRIPTION OF THE DRAWINGS

FIG. 4 is an elevational view of an apparatus for producing sheets containing air filled pockets.

FIG. 5 is a view taken on the line 5—5 of FIG. 4.

FIG. 6 is a view taken on the line 6—6 of FIG. 4.

DESCRIPTION OF THE PREFERRED EMBODIMENTS

Figure 1:
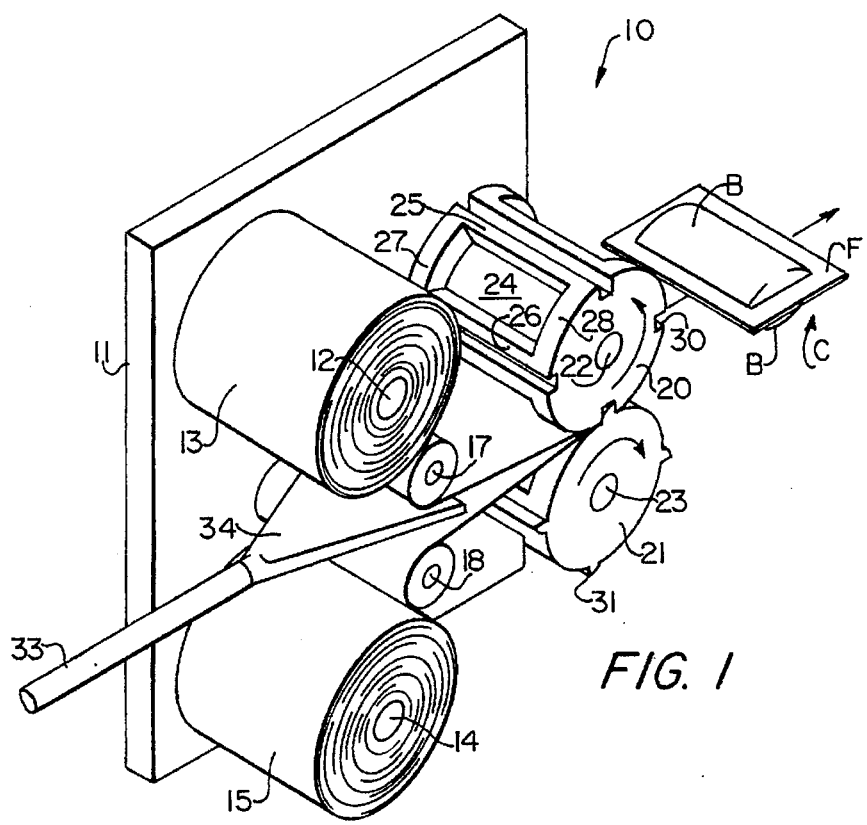
FIG. 1 is a perspectives view of an apparatus for forming individual filled cushions in accordance with the present invention.

Referring now to the drawings, wherein like or corresponding reference numerals are used for like or corresponding parts throughout the several views, there is shown in FIG. 1 an apparatus 10 for forming filled cushions in accordance with the present invention, and a filled cushion C made by the apparatus. Apparatus 10 comprises a support plate 11 which is preferably vertical, and having extending from it a first shaft 12 for supporting a roll 13 of plastic strip material with cohesive bonding material on one surface and as necessary a slip agent or release agent on the opposite surface. A second shaft 14 extends from the plate 11, generally below and parallel to the shaft 12. On shaft 14 is a roll 15 of the same plastic material as the roll 13, having one side coated with cohesive bonding material, and the other side provided, as necessary, with a slip agent or release material on the opposite side.

Extending from the plate 11 are a pair of spaced guide rollers 17 and 18 which guide the plastic strips from the rolls 13 and 15 in converging paths, where the plastic strips enter the nip between two spaced apart forming rollers 20 and 21 carried on shafts 22 and 23, which extend from the plate 11 in spaced, parallel relation. Each forming roller 20, 21 has a single row of depressions therein, each depression 24 being surrounded by a continuous land comprising laterally extending lands 25 and 26, which are parallel to the shaft 22, and peripherally extending lands 27 and 28. Also provided in the forming roller 20 is a cutoff slot 30.

The forming roller 21 is also provided with a single row of depressions, and lands, as described above in connection with the forming roller 20, but differs therefrom in that there are a plurality of outwardly peripherally spaced and laterally extending blade elements 31. The shafts 22 and 23 are driven by apparatus, not shown, for rotating them simultaneously at uniform speed, so that as the forming rollers 20 and 21 rotate with the shafts 22 and 23, a transverse land 25, 26 of one roller will be opposite and in spaced facing relationship with a similar transverse land on the other roller, and as the two forming rollers 20 and 21 continue their rotation, the depressions 24 in each of these forming rollers will come into facing relationship. The spacing between forming rollers 20, 21 is not greater than the thickness of two plastic strips. The drive apparatus for the shafts 22 and 23 may be, for example, an electric or an air motor rotating gears on the shafts 22 and 23.

A supply of a gas such as heated air is delivered to the apparatus through a conduit 33, the conduit being connected with a laterally extending nozzle 34 which extends into the space between the guide rollers 17 and 18, thereby discharging gas against the facing surfaces of the plastic strips delivered from the rolls 13 and 15.

In operation, as the plastic strips from the rolls 13 and 15 enter into the nip of the forming rollers 20 and 21, they are initially pressed together and sealed by a transverse land 26 of forming roller 20 and a corresponding land of forming roller 21, where a transverse seal or bond is formed between the cohesive material on the two strips. Also, the knife 31 enters into the groove 30, to perform a cutting operation. As the forming rollers 20 and 21 continue to rotate, the heated air which is discharged by the nozzle 20 prevents engagement of the two strips with each other, except at the transverse lands of the rollers 20 and 21. The heated air from the nozzle 20 causes the plastic strips to be deformed into the depressions 24 of the forming rollers 20 and 21, and as rotation of the forming rollers 20 and 21 continues, a lateral seal or bond is formed by the pressing action of the peripherally extending lands 27 and 28 of the roller 20 with respectively corresponding peripherally extending lands of the forming roller 21, thus causing the edge regions of the plastic strips to be bonded by the cohesive material. As will be apparent, further rotation provides a second transverse seal due to the force applied by the transverse land 25 of forming roller 20 and a corresponding land of forming roller 21, with further rotation effecting a severing of the plastic strip by action of a groove 30 and blade 31 to produce a cushion C. Cushion C, as will, be seen, has a hollow rectangular flange F formed of two layers of plastic strip, and within the hollow rectangular flange F there are bulged portions B of each plastic strip, within which is gas, principally that which has been discharged by the nozzle 34, which is at superatmospheric pressure. The coating of cohesive bonding material prevents air leakage from the cushion C.

Figure 2:
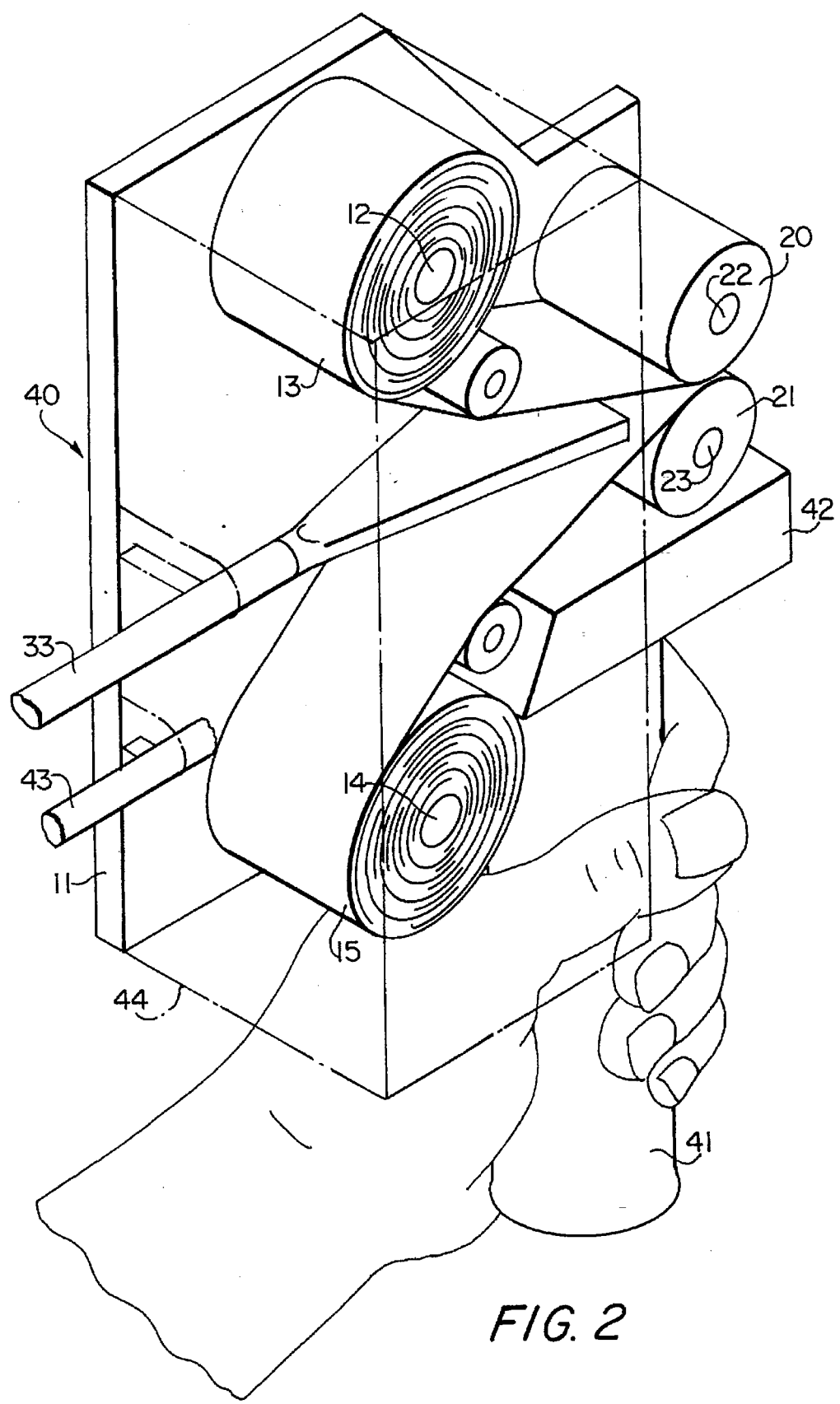
FIG. 2 is a perspective view of a hand held apparatus in accordance with the present invention similar to that of FIG. 1.

In FIG. 2 there is shown a hand-held apparatus 40, including a plate 11 and a handle 41 which extends downwardly from a housing 42 which is attached to the plate 11. Within housing 42 is drive apparatus (not shown) which is supplied with energy through an electrical or air conduit 43. A housing 44, shown in phantom lines, will be seen to encompass plastic rolls 13 and 15. The housing 44 is removable to permit replacement of the rolls 13 and 15 on the shafts 12 and 14. Intermediate drive elements from a motor within the housing 42 to the shafts 22 and 23 for the forming rollers 20 and 21 may be conventional, such as gears, or shafts and cone gears, which may be placed on either side of the plate 11. The forming rollers 20, 21 in FIG. 2 are essentially of the same construction as those shown in FIG. 1.

Figure 3:
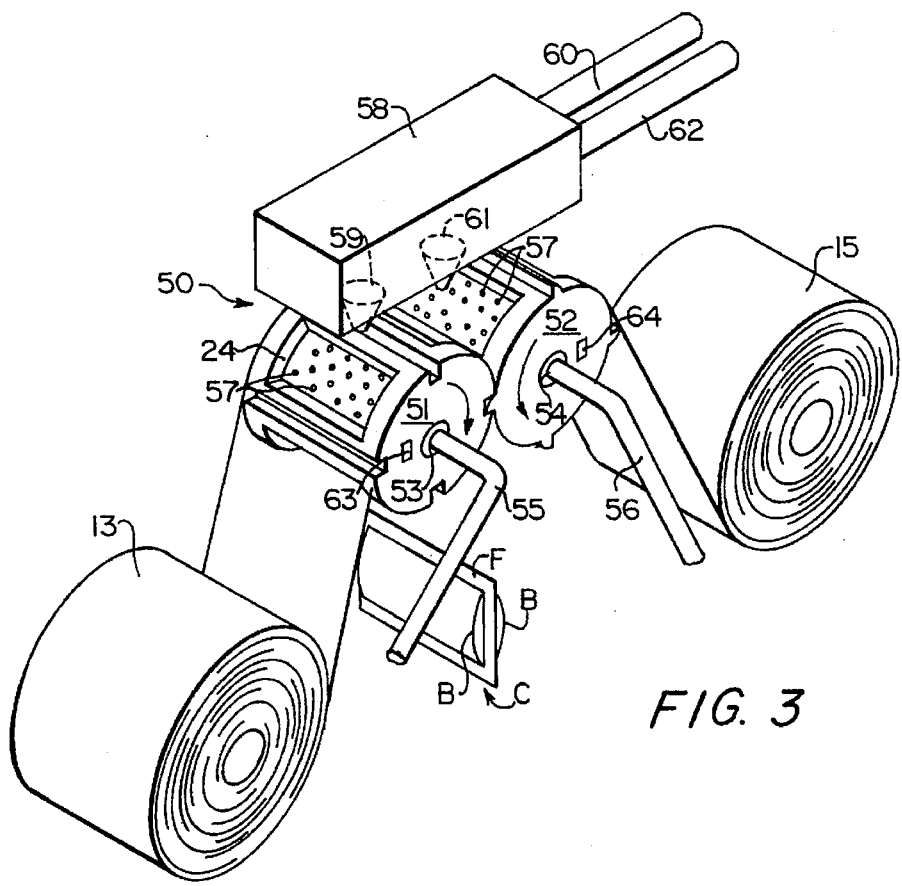
FIG. 3 is a perspective view of an apparatus, with parts removed, for forming individual foam filled cushions.

An alternate embodiment of the invention is shown in FIG. 3; it comprises an apparatus 50 which provides for the formation of pockets in plastic strips and the introduction of foam into the pockets. Apparatus 50 provides supports for rolls 13 and 15 of the formable cohesive coated plastic material, and a pair of forming rollers 51 and 52 supported on hollow driven shafts 53 and 54. The forming rollers 51, 52 are configured as are the rollers 20 and 21 of FIG. 1, but in addition have openings 57 in the bottom of the depressions 24, which openings are in fluid communication with the hollow shafts 53 and 54, each of which is fluid connected a conduit 55, 56 for vacuum. The forming rollers are heated, as by resistance elements 63 and 64 embedded therein and each supplied with current through an annular contact (not shown), or the coated plastic strips may be heated by hot air.

A head 58 comprises a first nozzle 59 connected to a conduit 60, the nozzle 59 being above a depression 24 in roller 51. A second nozzle 61 is connected to a conduit 62, and is in alignment with the depression 24 in forming roller 52. A first foam forming component is delivered from the nozzle 59 and conduit 60 and a second foam forming component is delivered from nozzle 61 and conduit 62. As will be appreciated, foam forming components will be dispensed from the nozzles 59 and 61 in measured amounts, the discharge being timed to coordinate with the location and formation of the bulges formed in each strip of plastic material.

In operation, cohesive coated plastic strips from the rolls 13 and 15 are delivered to the forming rollers 51 and 52 respectively, and as these forming rollers rotate, driven by the shafts 53 and 54, air is drawn through the openings 57 in the depressions 24, passing through the hollow shafts 53 and 54 and the conduits 55 and 56. As before, transversely extending lands will cause engagement of the cohesive coated strips of plastic in a transverse zone, after which as the forming rollers 51 and 52 rotate, sealed, bonded zones extending along the length direction of each of the plastic strips are formed by the peripherally extending portions of the lands on the forming rollers 51 and 52, and at the same time, the central portion of each forming strip is drawn into the recesses 24, forming opposed bulges in the two plastic strips. Into each of these bulges there is deposited a foam forming component from the nozzle 59 or nozzle 61. Continued rotation of the rollers 51 and 52 causes a second transverse sealing zone to, be formed, to thereby provide a complete peripherally extending hollow rectangular seal region around each pocket formed by the opposed bulges in the plastic strips. When the two foam forming components come into contact, a foam body will be formed within the opposed bulges B of the cushion C.

Referring now to FIGS. 4-6, there is shown an apparatus 65 for forming sheets containing bulged cushions therein. The apparatus 65 comprises shafts 66 and 67 for supporting rolls 68 and 69 of cohesive coated plastic sheet material. Suitable plastic is high density polyethylene of ½ to ¾ mil thickness, or NYLON. Plastic sheets are withdrawn from the rolls 68 and 69, and are guided by guide rollers 71 and 72 in converging paths. Opposed pairs of unheated edge rollers, are provided, there being seen in FIG. 4 edge rollers 73 and 74 which provide a seal by force at one edge region of the superimposed plastic sheets from the rolls 68 and 69. As shown in FIGS. 5 and 6, at the opposite edge region, there is a top roller 75, and a bottom roller 76. These two sets of rollers provide longitudinally extending and narrow sealed on bonded zones at the edge regions of the adjacent strips. A blower 77 blows air or other gas into a nozzle 78 which extends from the blower 77 towards and preferably beyond the edge rollers 73, 74, etc., and thereby form a generally flat tube T-1, sealed at its edge regions, the portions of the cohesive coated plastic sheets inwardly of the edge regions being prevented from contacting each other due to the inflation of the formed tube by the air discharging from the nozzle 78. The discharge end 79 of the nozzle 78 is in advance of a pair of unheated rollers 80 and 81, each of which is provided with peripherally extending lands 82 and 83, which are in axially spaced, parallel relationship along the rollers 80 and 81 as shown in FIG. 5. The lands 82, 83 on the rollers 80 and 81, apply force to cause the tube to have a plurality of spaced apart, parallel and longitudinally extending sealed zones or regions, so that there are in effect downstream (or to the right) of the rollers 80 and 81 a series of parallel inflated tubes T-2 extending between each pair of adjacent sealed zones 90. Between the zones 90 are the narrow width, longitudinally extending tubes T-2. The sheets then pass between unheated rollers 84 and 85, which have on their peripheries a series of radially extending transverse projections 86 and 87, which are in opposed relationship as shown in FIG. 4, and thereby apply force to provide successive transverse sealed or bonded zones 91. These transverse sealed zones are shown in FIG. 5, and serve to divide the tubes T-2 into individual pockets to thereby form a sheet with hollow rectangular sealed zones surrounding, bulges B, arranged in a grid pattern.

As illustrated in the drawing, there are 10 bulged portions laterally across the sheet, and the sheet may be approximately 24"-36" in width, for example. The length of the sheet is indeterminate, and severing of a sheet containing as many rows of the bulges B as desirable may be effected, to provide sheets of perhaps 1-6 feet in length. As will be appreciated, the sheet with the bulges B in it may be of any desired length, and division of the sheet may be either transversely or longitudinally of the sheet, or both, to obtain a single or plural cushions C as desired and necessary for a particular packaging requirement.

The apparatus 65, like the embodiments of FIGS. 1 and 2, may be provided on site, as in stores, shipping departments and in retail specialty packaging operations. There is required only a supply of electricity for driving the blower 77 and motors which will drive the rollers 80, 81 and rollers 84, 85. The apparatus 50 shown in FIG. 3, as will be appreciated, would also require the provision of suitable containers of foam forming agent and related equipment.

Figure 7:
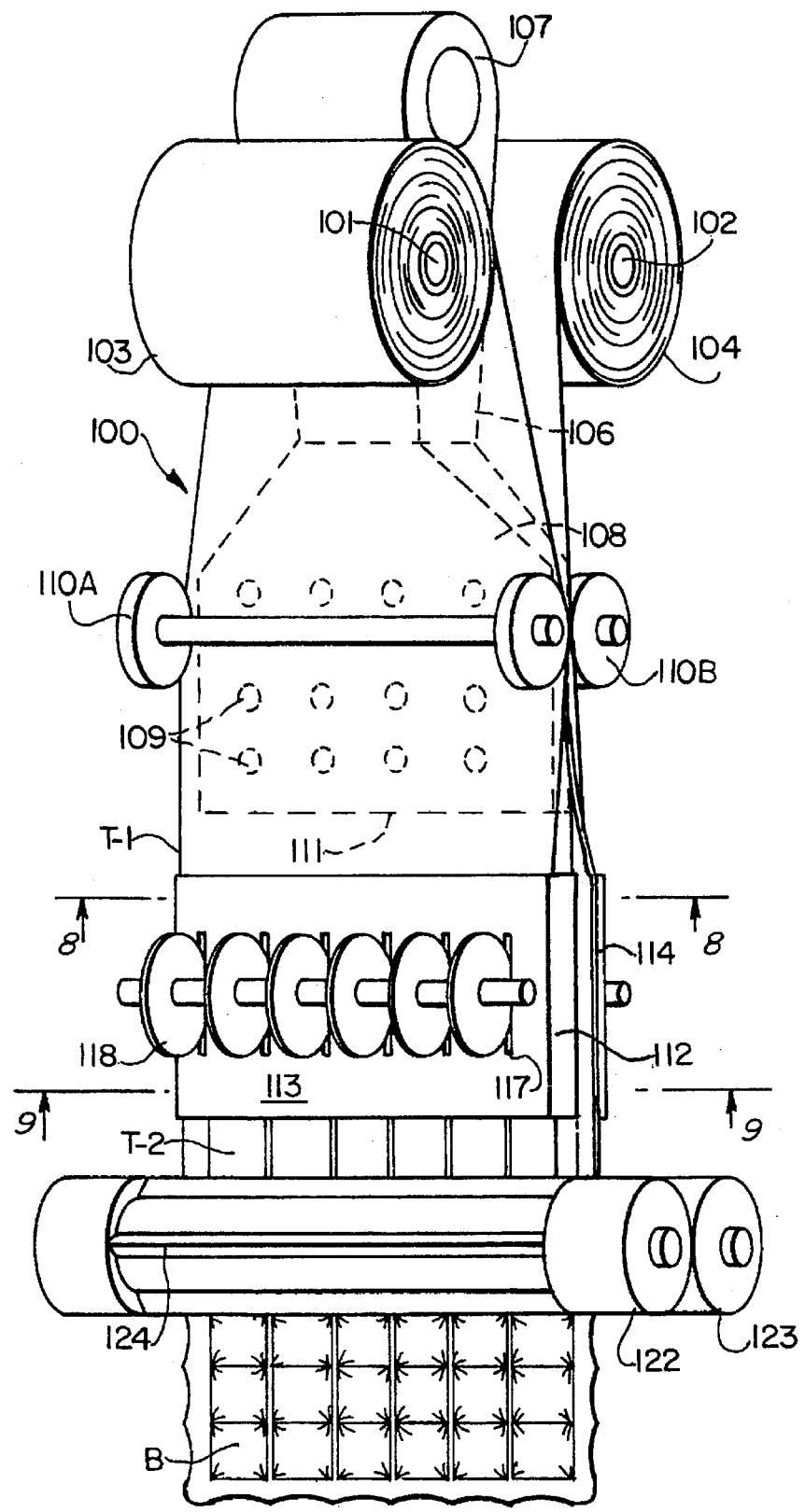
FIG. 7 is an elevational view of an alternate apparatus for forming filled cushions using sheets each having a surface coated with cohesive material.

In FIG. 7 there is shown an alternate apparatus 100 for on site, on demand production of gas-filled cushions. Apparatus 100 comprises shafts 101 and 102 for supporting rolls 103 and 104 of cohesive coated plastic sheet material, which is preferably non-stretchable. Between the rolls 103 and 104 is a duct 106 connected at one end (the upper end as shown in FIG. 7) to a blower 107, or other source of air under superatmospheric pressure, and at its other end, the lower end as shown in FIG. 7, the duct 106 is connected to a nozzle 108. Nozzle 108 is provided on its side surfaces with openings 109. The distal end 111 of nozzle 108 is preferably provided with openings to permit the escape of air from the blower 107. The openings 109 in the distal end 11 may be varied in size, or closed, depending on such factors as the size and extent of the openings 109 and the pressure generated by the blower 107.

The sheets, when withdrawn from the rolls 103 and 104, are led between pairs of unheated side sealing rollers 110A and 110B. The rollers 110A and 110B cause the strips to engage, and the two strips are thus sealed together at longitudinally extending zones adjacent each edge so as to form a tube T-1, within which is the nozzle 108. The strips do not engage the nozzle 108 due to the air which is discharged from nozzle 108 through the openings 109. The tube T-1 is of substantial width, being of greater width and thickness than the nozzle 108 in all directions.

Figure 8:
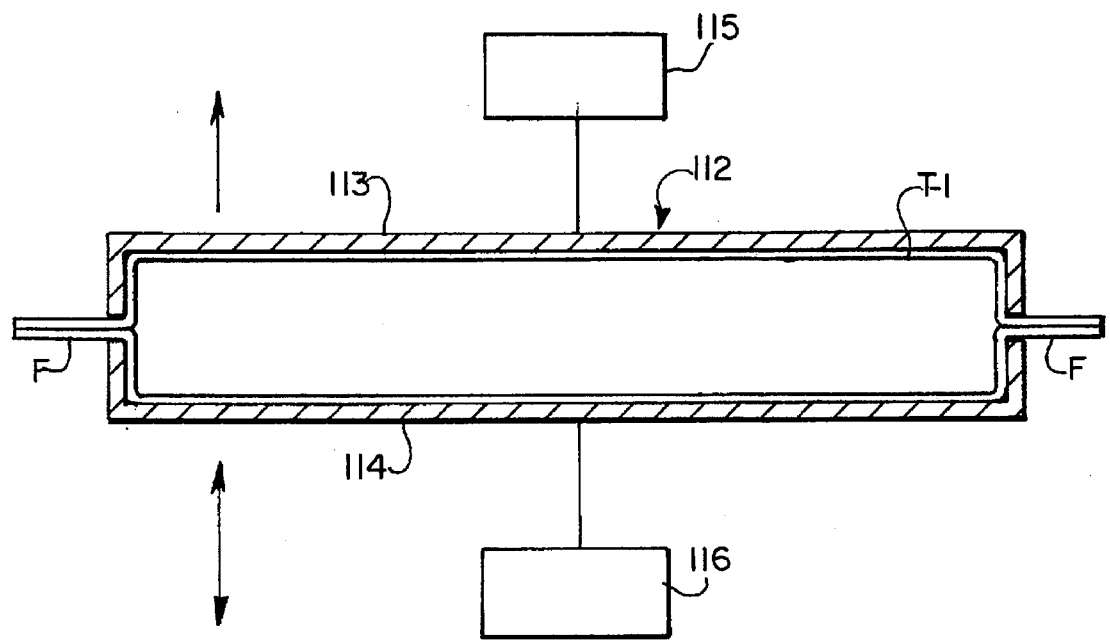
FIG. 8 is a cross-sectional view taken on the line 8—8 of FIG. 7.
Figure 9:
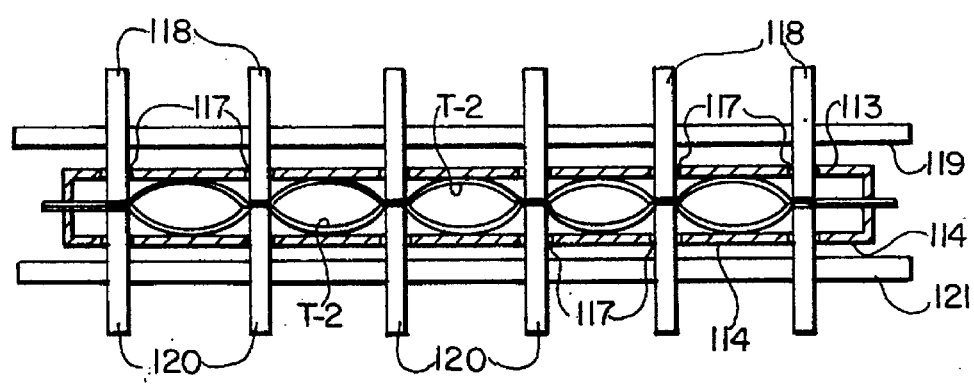
FIG. 9 is a cross-sectional view taken on the line 9—9 of FIG. 7.

Downstream of the side sealing rollers 110A and 110B is a restrainer 112 for the tube T-1, which causes the tube T-1 to be restrained into a generally rectangular cross-sectional shape as shown in FIG. 8. The tube T-1 has flanges F at either side, formed by the rollers 110A and 110B. The restrainer 112 comprises facing C-shaped channels 113 and 114. An adjustment control apparatus 115, 116, shown schematically on FIG. 8, is provided to adjust one or both of the channels 113 and 114 towards and away from each other to thereby vary the dimensions of the tube T-1. As will be appreciated, the adjustment control apparatus 115 and 116 may be mechanical lever systems, motor driven screws, hydraulic pistons, etc. As the adjustment control apparatus 115 and 116 cause adjustment of the spacing between the channels 113 and 114, the tube will take various width-to-thickness ratios. The channels 113 and 114 engage the exterior surfaces of the tube T-1, which are not coated with cohesive material, and the tube T-1 readily passes along the channels 113 and 114.

Referring again to FIG. 7, each of the channels 113 and 114 is provided with longitudinally extending slots 117. A plurality of sealing wheels 118 are supported on a shaft 119, and pass through the slots 117 in the channel 113. Similarly, a plurality of sealing wheels 120 are in opposed relationship to the sealing wheels 118, are supported on a shaft 121, and pass through the slots 117 in the channel 114. Thus, the sealing wheels 118 and 120 cause engagement of the plastic sheets in spaced, longitudinally extending zones, to cause the formation of longitudinally extending tubes T-2.

The tubes T-2 are then passed between unheated rollers 122 and 123 having transversely extending and mating lands 124 which cause engagement of the cohesive material on the plastic strips along transverse lines, so as to divide the tubes T-2 into a plurality of individual pockets of generally rectangular shape, with hollow rectangular seal zones surrounding bulges B The apparatus 100 forms, cushions in a grid-like pattern with the internal pressurization of each cushion or pocket, formed by the bulge configuration of the plastic sheets and internal superatmospheric pressure. The air, when introduced into the initially formed tubes T-1 is at a superatmospheric pressure, of approximately two atmospheres, for example. This superatmospheric pressure is present in the tubes T-1 and T-2 and in the resulting cushions, so as to prevent engagement of the cohesive plastic at portions of the sheets within the closed peripheral pattern of engagement caused by the sealing wheels 118 and 120, and by the rollers 122 and 123.

Once the cushions, in grid-like pattern, are formed, individual cushions may be severed, or strips containing any desired number of cushions may be severed from the basic structure. Where appropriate, cushion material in grid-like sheet format of cushions may be produced and stored over a substantial period of time, and the cushions will not significantly decrease in cushioning ability due to leakage of air, since the cohesive material which coats the interior surfaces of the cushion within the closed peripheral sealed pattern prevents air leakage. Of course, air leakage is also prevented through the peripheral seal zone.

There has been provided apparatus and method for on site production of individual filled cushions, either air or foam filled. There has also been disclosed apparatus and related method to enable the production on site of relatively small quantities, on demand, of a plurality of individual cushions such as may be used to package a fragile object, for storage or transportation to a remote location. There need be provided only normal electric current, or in the instances of the apparatus providing a foam filled cushion, there is to be provided in addition, only a supply of readily available foam forming components.

Further, there is disclosed a simple and economical apparatus and method for forming sheets of filled cushion elements on site, which sheets may be severed as desired to provide relatively small sheets which may be used on site as needed, and individual filled cushions.

The claims and specification describe the invention presented, and the terms that are employed in the claims draw their meaning from the use of such terms in the specification. Some terms employed in the prior art may be broader in meaning than specifically employed herein. Whenever there is a question between the broader definition of such term as used in the prior art and the more specific use of the term herein, the more specific meaning is meant.

What is claimed is:

1. A method of forming pressurized filled cushions comprising:

provided first and second plastic strips each having a cohesive air impervious material which bonds to itself by contact coated on one side thereof, positioning at least a portion of said sheets with said coated sides in facing relationship, joining said sheets at a partly closed peripheral pattern by applying only compressive force by unheated elements to said sheets in a partly closed peripheral pattern to cause said cohesive materials to mutually contact in a partly closed peripheral pattern, introducing gas under superatmospheric pressure between said sheets and into the space between said sheets bounded by said partly closed peripheral pattern, to cause at least one said sheet to be bulged outwardly and to maintain the cohesive material coatings out of contact other than at said joined pattern, and joining said sheets by applying said force to said sheets at locations to form with said partly closed peripheral pattern a completely closed and sealed peripheral pattern with the sheets within said closed peripheral pattern being spaced from each other.

2. The method claim 1, wherein said positioning of portions of said sheets comprises feeding of said sheets in converging paths.

3. The method of claim 1, wherein said first mentioned joining of said sheets at a partly closed peripheral pattern comprises joining said sheets by said applying of force to cause said cohesive materials on said sheets to engage at a plurality of lines extending in parallel relationship.

4. The method of claim 3, wherein said second mentioned joining comprises joining said sheets at at least one line by applying a force transverse of said first mentioned lines.

5. A method of forming pressurized filled cushions comprising:

providing first and second plastic strips each having a cohesive, air impervious material which bonds to itself by contact coated in a closed peripheral pattern on one side of each said plastic strip, positioning at least a portion of said sheets with said coated patterns in facing relationship, joining said sheets at the pattern provided by said coating by applying only compressive force to unheated elements to said sheets at the pattern of said coating to cause said cohesive materials to mutually contact in a closed peripheral pattern while introducing gas under superatmospheric pressure into the space between said sheets within said closed peripheral pattern to cause at least one said sheet to be bulged outwardly within said closed peripheral pattern.

* * * * *